United States Patent [19]

Okumura et al.

[11] Patent Number: 4,747,015

[45] Date of Patent: May 24, 1988

[54] GAS INSULATED SWITCHING APPARATUS

[75] Inventors: Kiyoshi Okumura; Kazuaki Oishi; Masahira Sakurai, all of Hitachi, Japan

[73] Assignee: Hitachi, Ltd., Tokyo, Japan

[21] Appl. No.: 35,435

[22] Filed: Apr. 7, 1987

[30] Foreign Application Priority Data

Apr. 7, 1986 [JP] Japan ................................. 61-78369

[51] Int. Cl.⁴ .............................................. H02B 1/20
[52] U.S. Cl. .................................... 361/341; 307/147; 361/335; 200/148 B
[58] Field of Search ............... 361/131, 332, 333, 335, 361/341; 200/48 R, 148 R, 148 B, 148 D, 148 E, 148 F; 307/147

[56] References Cited

U.S. PATENT DOCUMENTS 4,354,220 10/1982 Oishi ..................................... 361/341
4,535,383 8/1985 Yamaoka ............................ 361/341
4,638,403 1/1987 Amano ................................ 361/341

Primary Examiner—G. P. Tolin
Attorney, Agent, or Firm—Antonelli, Terry & Wands

[57] ABSTRACT

In a gas insulated switching apparatus, a pair of buses are made up of coaxially disposed conductors or the like and disconnectors are connected to one of the buses. The buses and the disconnectors are integrally configured in one gas section of a gas tube path having a plurality of sections so as to reduce the size of the apparatus significantly.

8 Claims, 7 Drawing Sheets

GAS INSULATED SWITCHING APPARATUS

BACKGROUND OF THE INVENTION

The present invention relates to a gas insulated switching apparatus and more particulary, to a gas insulated switching apparatus with a metering outfit (combined voltage-current transformer) (hereinafter referred to as an "MOF") used for a power receiving system.

A gas insulated switching apparatus for a power receiving system has an MOF for measuring the electric energy consumed.

A gas insulated switching apparatus of this type is well-known as disclosed, for example, in Japanese Laid-Open Utility Model Publication No. 51-7615. FIG. 6 is a circuit diagram showing a gas insulated switching apparatus comprising a gas tube path having a plurality of gas sections filled with a high-insulation gas.

This circuit is called a "two-line two-bank system" and is supplied with power from two systems of transmission lines 1a and 1b. The power transmission lines 1a and 1b are led into a gas insulated switching apparatus through bushings 2a and 2b, and is connected by a bus 6 through disconnectors 3a and 3b, circuit breakers 4a and 4b, and disconnectors 5a and 5b. The same gas section where the bus 6 is arranged has also a bus 8, and the MOF 7 is connected between the buses 6 and 8. Further, the bus 8 is led out by bushings 13a and 13b through an insulating spacer 10, and disconnectors 11a and 11b and is connected to transformers 12a and 12b.

Since the MOF 7 is a low impedance device, the potential difference between the buses 6 and 8 is approximately several volts. It is, therefore, possible to arrange the buses 6 and 8 in the same gas section. As a result, the switching apparatus has been reduced in size by using conductors of coaxial cylinders or semicircular split conductors.

FIG. 7 is an enlarged view showing the essential parts of the switching apparatus of FIG. 6. This diagram shows parts near the buses 6 and 8 and the disconnector 11a.

A bus casing 15 sealed with an insulating gas has fixed a conductor 21 connected to the disconnector 5a of FIG. 6. This conductor 21 is connected electrically to an inner conductor 22 of coaxially cylindrical double conductors. The inner conductor 22 is electrically insulated from an outer conductor 23 with an insulating member 29 between the conductors 22 and 23, and is connected to an end of the disconnector 5b in FIG. 6. The ends of the outer conductor 22, on the other hand, are connected to the disconnectors 11a and 11b in FIG. 6. The MOF 7 is inserted between the conductors 22 and 23. The inner conductor 22 makes up the bus 6, and the outer conductor 23 the bus 8. The outer conductor 23 is electrically connected to a central conductor of an insulating spacer 16 through a collector 30 branching downward. This insulating spacer 16 defines a gas section 31 on the double conductors side and a gas section 27 on the disconnector side. A collector 24 on the needle (moving element) side of the disconnector 11a is fixed on the insulating spacer 16, and a stator 25 is fixed on an insulating spacer 17. The collector 24 and the stator 25 are connected by way of a needle 26.

In the configuration of FIG. 7, as compared with that developed before the double-conductor construction allows the buses 6 and 8 to be arranged in the same gas section 31, thereby reducing the size of the switching apparatus.

The conventional apparatus, however, with the double conductors arranged between exclusive buses for a low impedance device, has its own limitation in size reduction.

SUMMARY OF THE INVENTION

The object of the present invention is to provide a gas insulated switching apparatus having a switching construction further reduced in size.

In order to achieve the above-mentioned object, there is provided according to the present invention a gas insulated switching apparatus in which disconnectors are arranged integrally in a gas section accomodating buses connected to a low impedance device.

According to the present invention configured as above, buses and disconnectors are integrally constructed in a conventional bus gas section, and therefore a more compact switching apparatus is realized.

BRIEF DISCRIPTION OF THE DRAWINGS

The above and other objects, features and advantages will be made apparent by the detailed description taken in conjunction with the accompanying drawings, in which.

DESCRIPTION OF THE PREFERRED EMBODIMENTS

An embodiment of the present invention will be described with reference to the accompanying drawings.

Figure 1:
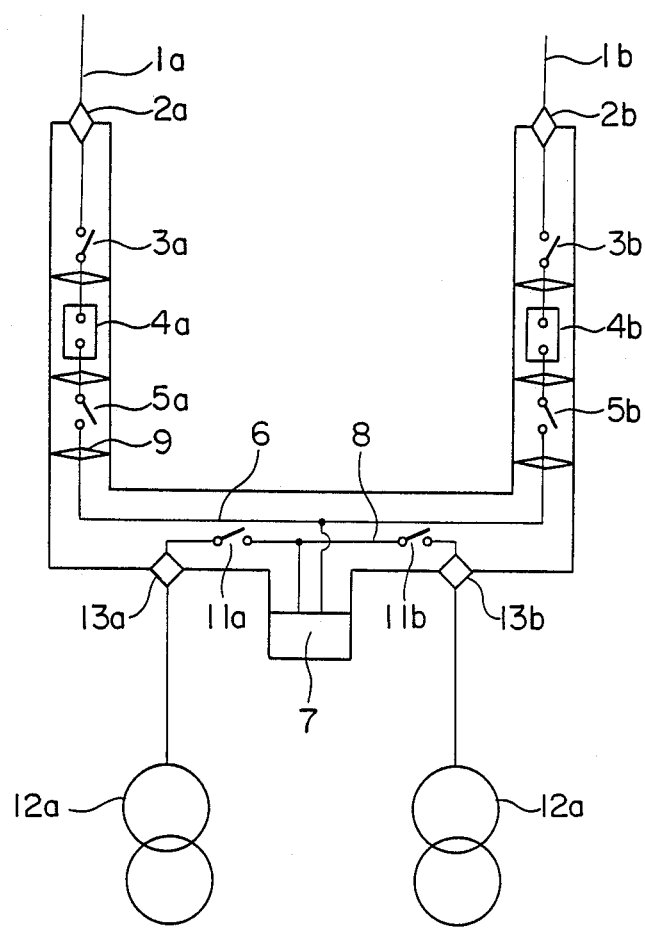
FIG. 1 is a circuit diagram showing a gas-insulated switching apparatus having a plurality of gas sections according to a first embodiment of the present invention.
Figure 6:
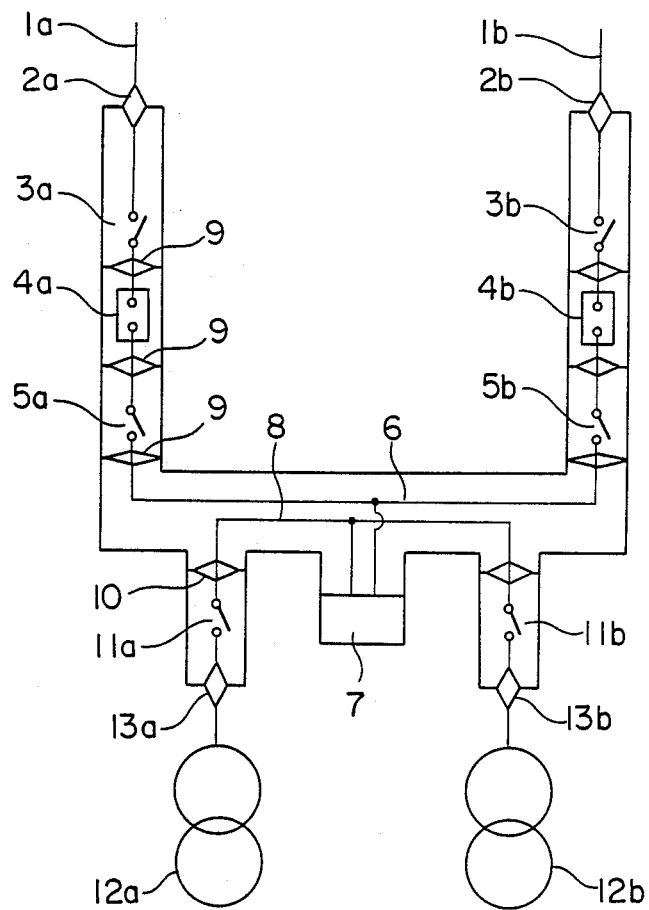
FIG. 6 is a circuit diagram of a conventional gas insulated switching apparatus having a plurality of gas sections.

FIG. 1 is a circuit diagram of a switching apparatus according to the present invention shown with a gas section. The same component parts as those of the conventional apparatus in FIG. 6 are designated in FIG. 1 by the same reference numerals respectively as in FIG. 6. The difference of this circuit from the conventional configuration lies in that, in the embodiment under consideration, disconnectors 11a and 11b are arranged in the same gas section of conductors 6 and 8 that are connected to a low impedance device like the MOF 7.

Figure 2:
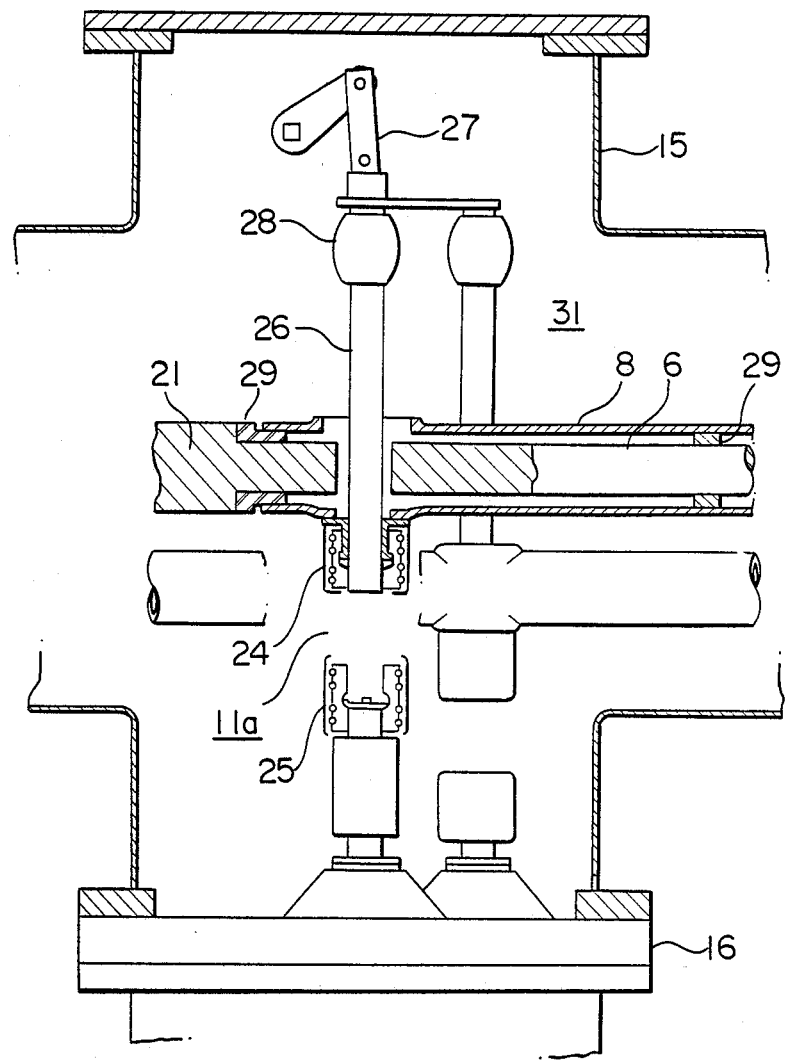
FIG. 2 is a sectional view showing a configuration of the essential parts in a gas section in FIG. 1.

The configuration of the MOF 7 in FIG. 1 is symmetric, and therefore the disconnector 11a and the buses 6 and 8 on the left side alone will be described with reference to FIG. 2.

A casing 15 sealing an insulating gas is substantially cruciform. The part of the casing 15 that extends leftward contains a conductor 21 connected to the disconnector 5a in FIG. 1 and supported on the insulating spacer 9. The right part of the casing 15, on the other hand, has contained buses 6 and 8 connected to the disconnector 5b, while the lower part of the casing 15 is connected to a transformer 12a.

The conductors 6 and 8 are configured in coaxial cylinders of outer and inner conductors which are insulated electrically to each other by an insulating member 29 between the conductors. The outer conductor makes up the bus 8, and the inner conductor the bus 6. The bus 8 carries at its lower part a collector 24 for the disconnector 11a. A stator 25, which is arranged in opposed relations with the collector 24, is mounted on the insulating spacer 16 or a bushing. The collector 24 and the stator 25 are interconnected by a needle 26. The needle 26 is coupled to a link unit 27 through an insulating member 28. This link unit 27 is driven by a drive unit (not shown) to shift the needle 26 vertically to a closed or open position. As explained above, the needle 26 is normally connected electrically to the bus 8 through the collector 24 but not to the bus 6. In other words, the bus 6 making up the inner conductor has formed a through hole, a notch, a bent portion or the like through which the needle is passed, in a direction along the diameter perpendicular to the axis of the conductor, thus forming a gas space between the needle 26 and the inner conductor.

Figure 7:
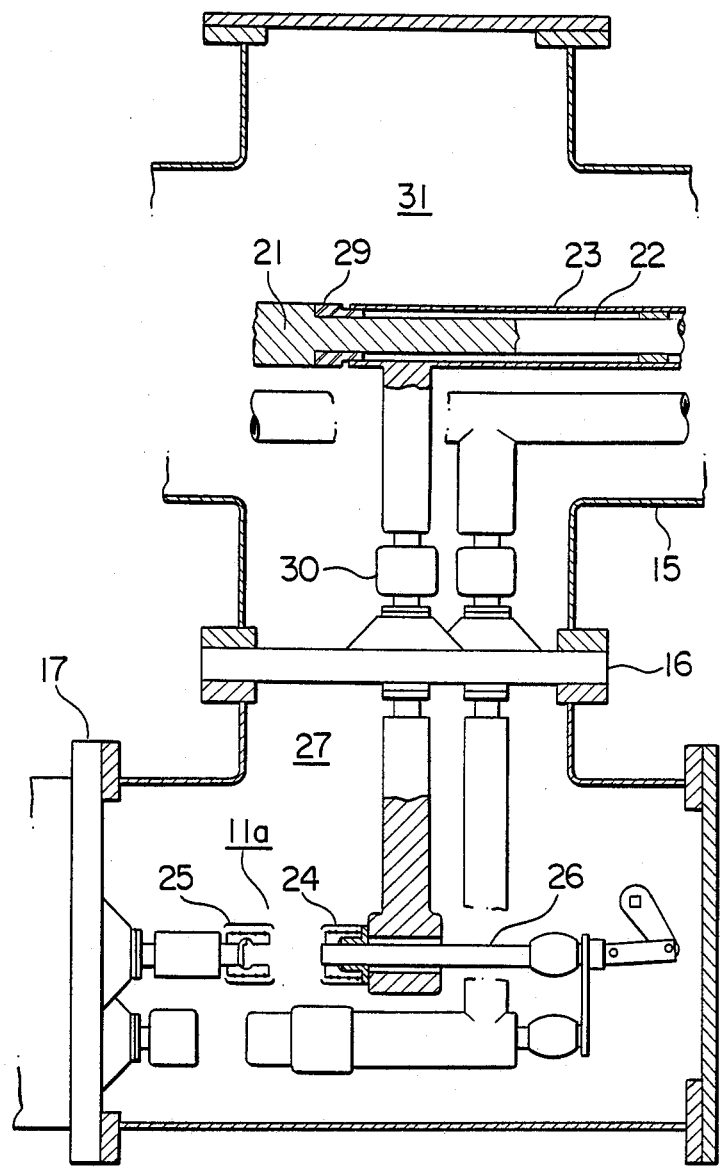
FIG. 7 is a sectional view showing a configuration of the essential parts in two gas sections in FIG. 6.

The disconnector 11a is configured in this way in the same gas section as the buses 6 and 8. As a result, the collector 24 or the stator 25 is supported on the buses. Unlike in the prior art, it is not necessary to support the collector 24 and the stator 25 on the insulating spacers 16 and 17 respectively, thereby saving one each of the gas sections and the insulating spacers. According to the present invention, the buses 6 and 8 and the disconnector 11a are constructed in the gas section 31 in FIG. 7, and therefore the casing making up a gas section required to accomodate the disconnector 11a in the prior art is eliminated, thereby further reducing the size of the whole apparatus.

Figure 3:
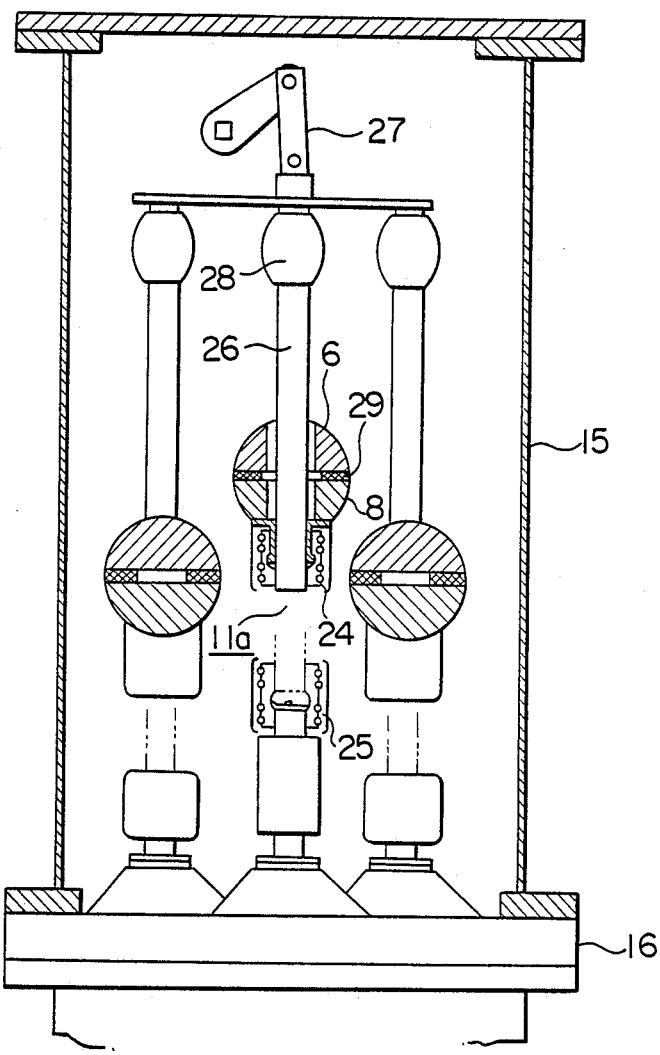
FIGS. 3, 4 and 5 are sectional views showing the essential parts in a gas section according to second, third and fourth embodiments of the present invention.
Figure 4:
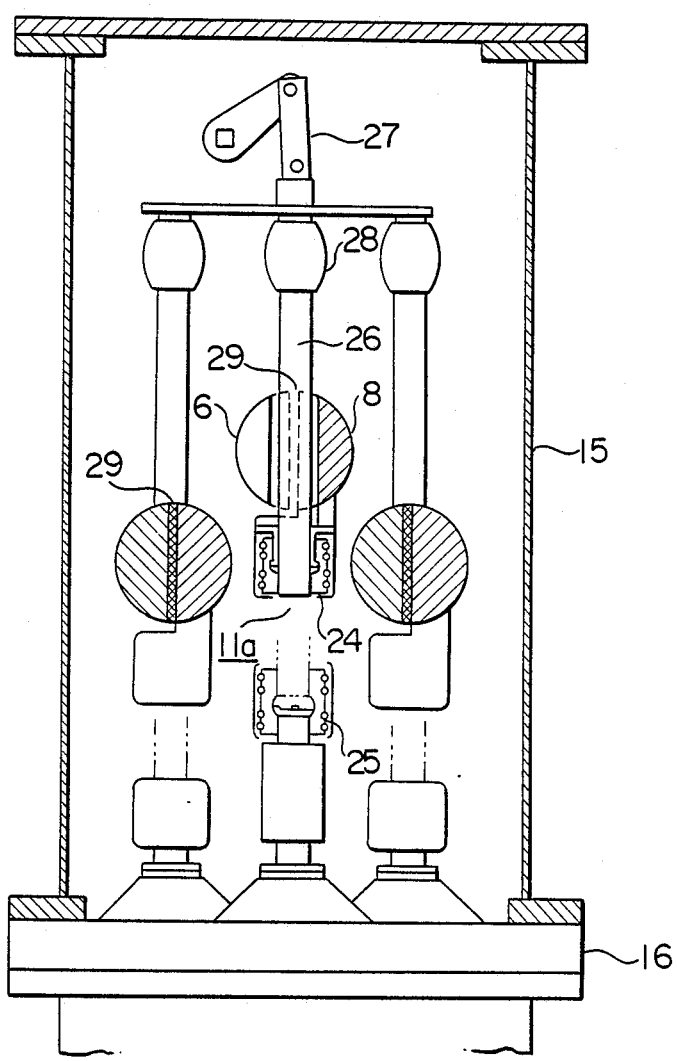

Second and and third embodiment of the present invention are shown in FIGS. 3 and 4, respectively. These embodiments are different from the first embodiment in a construction whereby the disconnector needle 26 is insulated from one bus and connected to the other bus.

In the second embodiment shown in FIG. 3, a hollow or solid cylinder is divided into two upper and lower parts electrically insulated from each other with an insulating member 29 between the parts. The upper conductor makes up a bus 6, and the lower conductor constitutes the bus 8. A collector 24 of the disconnector 11a, which is mounted on the lower bus 8, is normally electrically connected with the needle 26. A through hole or the like through which the needle is passed is formed along the radius of the semicircular conductors and in the direction perpendicular to the dividing plane.

In the third embodiment shown in FIG. 4, in contrast, a conductor is divided into two parts, right and left, with an insulating member 29 interposed between the dividing planes for electrical insulation of the two divided conductor parts. The left conductor shown in FIG. 4 makes up the bus 6, and the right conductor in the same drawing the bus 8. A collector connected to the right bus 8 is supported on the bus 8 at the lower parts of the buses 6 and 8 in the manner shown. A through hole is formed between the buses faced to each other, and has a needle 26 adapted for vertical motion and insulated from the bus 6. This through hole is formed along the diameter of the semicircular conductors and in a horizontal direction relative to a dividing plane.

As apparent from, the aforementioned embodiments, the buses 6 and 8 may be constructed in a variety of ways. They are configured by six conductors in one case, or by phase in another.

Figure 5:
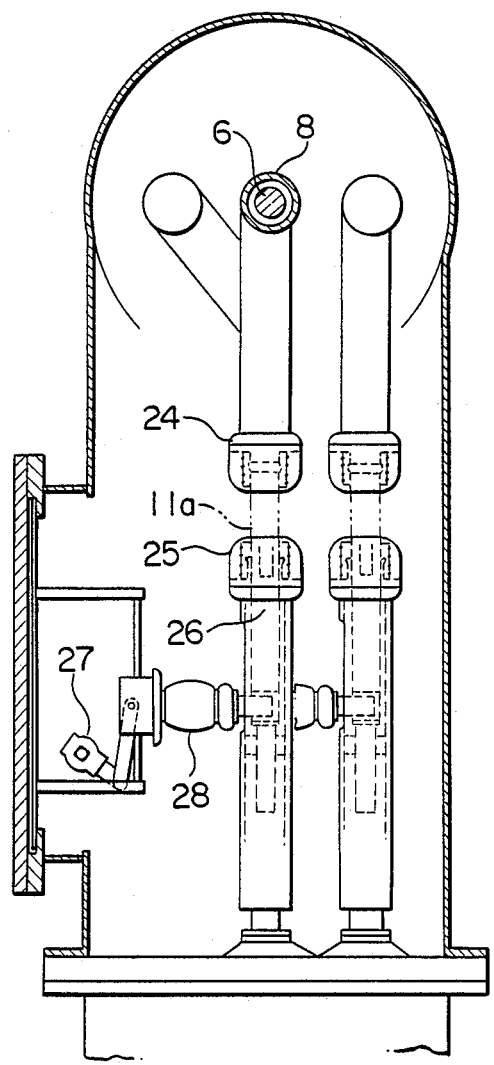

Further, as seen according to a fourth embodiment shown in FIG. 5, the stator 25 of the disconnector 11a may be mounted on the buses 6 and 8. The needle 26 is adapted to perform the switching operation by a link unit 27 of a linear disconnector generally known.

It will thus be understood from the forgoing description that according to the present invention, the collector or stator of a disconnector is mounted on one of a couple of buses connected with a low impedance device accomodated in a gas section, thereby making it possible to reduce the size of a gas insulated switching apparatus further.

We claim:
1. A gas insulated switching apparatus comprising:
a pair of conductors disposed in a section of a casing having a plurlaity of gas sections, wherein each section is filled with high insulation gas and sealed from each other;
a low impedance device connected between the conductors; and
a pair of disconnectors each having a collector, a stator and a needle, said disconnectors connected to one of the conductors, one of said collector and stator of each disconnector being mounted on said conductor so that the needle of each disconnector penetrates through and is connected via said mounted one of said collector and stator to one of the conductors in the same gas tube casing section accomodating said pair of conductors, said pair of disconnectors being in the same gas section as said low impedance device.

2. A gas insulated switching apparatus according to claim 1, wherein said pair of conductors include coaxially disposed conductors, and wherein one of said collector and stator being mounted on the outer one of the coaxially disposed conductors.

3. A gas insulated switching apparatus according to claim 1, wherein said pair of conductors are disposed in proximity to each other through an insulating member.

4. A gas insulated switching apparatus for a power receiving system including a plurality of gas sections, each being filled with high insulation gas and sealed from each other, comprising:
a gas tube casing containing said gas sections;
a transmission line supplying power;
a pair of conductors arranged in a gas section of said gas tube casing, one of said conductors being disposed so as to receive power from said transmission line;
a metering outfit connected in parallel to said pair of conductors for metering the power consumed thereby; and
a pair of disconnectors arranged in the same gas section as the gas section of said gas tube casing which includes said metering outfit and being connected to the other one of said conductors, each of said disconnectors having a collector, a stator and a needle for interconnecting the collector and the stator.

5. A switching apparatus according to claim 4, wherein said pair of conductors comprise coaxilly disposed conductors, the collector being electrically connected to the outer conductor of the coaxially disposed conductors, the stator being fixed on a spacer of said gas section, and a hole through which the needle passes being formed along the diameter of the coaxially disposed conductors and in a direction perpendicular to the longitudinal axis of the coaxially disposed conductors.

6. A switching apparatus according to claim 4, wherein said pair of conductors comprise two parallelly disposed semicircular conductors obtained by dividing a solid cylindrical conductor into two parts and an insulating member being disposed between the dividing planes of the semicircular conductors, said collector being electrically connected to one of said semicircular conductors, said stator being fixedly secured to a spacer of said gas section, and a hole through which the needle passes being formed through and in a transverse direction of the semicircular conductors and which defines a direction perpendicular to the dividing planes of said semicircular conductors.

7. A switching apparatus according to claim 4, wherein said pair of conductors include two parallelly disposed semicircular conductors obtained by dividing a solid cylindrical conductor into two parts and an insulating member being disposed between the dividing planes of said semicircular conductors, said collector is electrically connected to one of the semicircular conductors, said stator is fixedly secured to a spacer of said gas section, and a hole through which said needle passes being formed through and in a transverse direction of said semicircular conductors and which defines a direction parallel to the dividing planes of said semicircular conductors.

8. A switching apparatus according to claim 4, wherein said pair of conductors comprise coaxially disposed conductors, said stator being electrically connected to the outer one of said coaxially disposed conductors, and said collector being securely fixed on a spacer of said gas section.

* * * * *